United States Patent [19]

Grawunde

[11] 4,346,733

[45] Aug. 31, 1982

[54] CONTROL VALVE

[75] Inventor: Frederick G. Grawunde, Painesville, Ohio

[73] Assignee: Fluid Controls, Inc., Mentor, Ohio

[21] Appl. No.: 173,436

[22] Filed: Jul. 29, 1980

[51] Int. Cl.³ ............................................ F16K 17/38

[52] U.S. Cl. ...................................... 137/493; 91/420; 137/454.5; 137/495; 137/508

[58] Field of Search .................... 251/63, 282; 91/420; 137/493, 454.5, 508, 540, 494, 495

[56] References Cited

U.S. PATENT DOCUMENTS

| | | | |
|---|---|---|---|
| 3,529,624 | 9/1970 | Cryder | 137/509 X |
| 3,595,264 | 7/1971 | Martin | 137/493 |
| 3,596,566 | 8/1971 | Krehbiel | 91/420 |
| 3,792,715 | 2/1974 | Parrett | 137/493 |
| 4,040,600 | 8/1977 | Coppola | 251/63 |

OTHER PUBLICATIONS

Racine Hydraulics Catalog, Valve Design No. 1318, Nov., 1970.

*Primary Examiner*—Robert G. Nilson
*Attorney, Agent, or Firm*—Watts, Hoffmann, Fisher & Heinke Co.

[57] ABSTRACT

A control valve that can be used as a pilot-assisted pressure relief valve or as a sequence valve, which is substantially insensitive to system back pressure. The valve comprises a valve body 10 defining a multistep bore 36, and a valve member 44 engageable with a coaxial valve seat 46, both supported for reciprocating motion within the bore 36 and cooperating to control the fluid communication between first and second ports 30, 32 defined in the valve body 10. A primary biasing spring 48 enclosed within a vented spring chamber 52 urges the valve member 44 into engagement with the valve seat 46. Fluid pressure at the first port 30 exerts fluid forces on the valve member 44 that opposes the primary spring force. The valve member 44 is a unitary element including first and second annuli **44*a*, 44*b* joined by a reduced diameter shank portion 44*c*. A radial surface on the first annuli 44*a* defines a net effective pressure area against which fluid pressure at the port 30 is applied. An end surface 92 formed on the second annulus 44*b* defines an effective pressure area against which pilot pressure can be applied to further oppose the primary spring force. The valve member 44 disengages the valve seat 46 when the combined force of fluid pressure at the first port and the pilot pressure applied to the end surface 92 exceeds the primary spring force. The coaxial valve seat forms a check valve that is operative to allow substantially unrestricted fluid flow from the second port 32 to the first port 30.**

7 Claims, 5 Drawing Figures

CONTROL VALVE

TECHNICAL FIELD

The present invention relates generally to flow control valves and in particular to pilot-assisted, pressure relieving control valves and sequence valves.

BACKGROUND ART

Pilot-assisted, pressure relieving control valves, often called overcenter or holding valves, are used in a variety of fluid control applications. In one application, a valve of this type is used to control fluid flow to and from an actuator and to hydraulically lock the actuator in position when fluid flow is terminated. In this application, this type of valve prevents load induced "runaway" and provides a static overload relief function. In some commercially available valves, a check valve section is included as part of the valve and allows flow to proceed unimpeded, from the source to the actuator but prevents fluid flow from the actuator to the source until a predetermined system pressure is reached or until a predetermined pilot pressure is applied to a valve member in the valve.

In an application where the actuator is part of an operating system for a boom assembly, a pilot-assisted, pressure relieving valve is used to control the raising and lowering of the boom and more importantly, is used to lock the boom assembly in position when fluid flow is terminated. Specifically, in order to raise the boom assembly, fluid is directed to the boom actuator via the check valve section of the valve. As soon as flow terminates, the check valve operates to prevent return fluid flow from the actuator to the source until a pilot pressure is applied to a flow control element within the valve or until a predetermined system pressure is exceeded.

Another application for this type of control valve is in a hydrostatic drive for a vehicle. Those skilled in the art will recognize that a hydrostatic drive generally comprises a hydraulic pump for generating a source of pressurized fluid, a fluid motor connected to the drive wheels of the vehicle and conduits for conveying pressurized fluid from the pump to the fluid motor and vice versa. It is desirable to provide a deceleration function in the hydrostatic drive system so that vehicle motion will be retarded when the output of the fluid pump is reduced or terminated. As is well known, during vehicle deceleration, the fluid motor is driven by the vehicle wheels and generates an output fluid pressure. By restricting the return flow of fluid from the motor to the source or fluid pump, a deceleration force that resists rotation of the vehicle wheels will develop, thereby slowing the vehicle. It has been found that pilot-assisted, pressure relief valves disposed in the fluid conduits between the fluid pump and fluid motor could possibly provide the necessary flow resistance. In theory, these valves would prohibit flow from the fluid motor to the actuator until a predetermined pressure was reached or until a control or pilot pressure was applied.

It has been found however, that many commercially available control valves of this nature, do not work satisfactorily in applications where significant "back pressure" is encountered. It was found that in many prior valves of this type, system backpressure would be manifested as an increase in the effective relief setting of the valve.

Sequence control valves often include functional similarities with pilot-assisted, pressure relieving valves. Sequence valves are employed in fluid circuits to control the order of communication between a source of pressurized fluid and one or more fluid actuated devices. By construction, sequence valves usually operate as simple on/off valves that is, once a threshold pressure has been reached at the input port, the valve completely opens to allow fluid flow between input port and an output port. In general, the sequence valve will not throttle fluid flow as a function of input pressure. Pilot-assisted, pressure relieving valves on the other hand will open in proportion to the applied pilot pressure and therefore as the pilot pressure is reduced, flow through the valve will be throttled. Due to the operational differences between sequence and pilot-assisted, pressure relief valves, they have not generally been interchangeable in a given application. Specifically, it was found that the operation of many, if not most pilot-assisted relief valves, were detrimentally affected by system backpressure normally encountered in sequence valve environments.

In pilot-assisted valves it is also important that the pilot ratio not be excessive. Excessive pilot ratio causes the valve to be unduly sensitive and when used in control applications, i.e., the raising and lowering of a boom assembly, smooth gradual actuation of the hydraulic system is difficult to achieve by the operator. In some prior art pilot-assisted, pressure relieving valves it was found that although they were relatively unaffected by system backpressure, their configuration resulted in an excessive pilot ratio, i.e., 25:1 or more.

DISCLOSURE OF INVENTION

The present invention provides a new and improved control valve that can be used either as a pilot-assisted, pressure relieving valve or a sequence valve. The disclosed valve is substantially insensitive to system backpressure and includes a relatively low pilot ratio rendering it particularly useful in control circuits in which carefully controlled actuator motion is desired and abrupt movements are to be avoided. Fluid flow through the valve is throttled as a function of the applied pilot pressure. The moderate pilot ratio allows an operator to easily modulate the fluid flow from the maximum flow rate sustainable by the valve to substantially zero.

According to a preferred embodiment of the invention, the control valve assembly comprises a valve body that defines spaced first and second ports and a bore in which a valve member is slidably disposed. Preferably, the valve member is an elongate element mounted for longitudinal, reciprocating motion within the bore and includes a poppet valve portion spaced from one end. A movable valve seat is also slidably supported within the bore and surrounds a portion of the valve member. The valve seat includes a surface engageable with a peripheral seating edge surface defined by the poppet valve portion of the valve element. When the valve seat engages the poppet valve portion, fluid flow from the first port to the second port is interrupted.

The engagement between the valve member and the valve seat is determined by both mechanical and fluid generated forces. Specifically an adjustable, primary biasing spring enclosed within a vented chamber formed in part, by the valve body urges the valve member towards engagement with the valve seat. The valve seat, in turn, is biased preferably by a relatively light spring towards engagement with the valve member. The poppet valve portion of the valve member includes a radial surface that forms an effective pressure area against which fluid pressure at the first port impinges and develops a fluid force that urges the valve member away from the valve seat. Essentially, the fluid forces developed on this radial surface oppose the adjustable spring force. When the fluid force exceeds the spring force, the valve member disengages the valve seat and fluid flow can proceed from the first to the second port. The adjustment of the primary biasing spring determines the relief setting for the valve.

Unlike most prior pressure relieving valves, the present valve is substantially unaffected by system back pressure due to the valve seating configuration and the vented spring chamber. Because the valve seat engages substantially, a peripheral edge of the radial surface, the fluid forces acting on the valve element are balanced and thus fluid pressure at the second port will not apply a net fluid force to the valve element in the longitudinal direction. System back pressure (present at the second port) will have minimal effect on the relief setting of the valve. This feature allows the disclosed valve to be used as a sequence valve. In this application, the first port is connected to the source of pressurized fluid and the second port is connected to the fluid operated device, i.e. actuator. The valve prohibits flow from the source to the device until a threshold pressure is reached (determined by the spring setting) and terminates the flow if the system pressure falls below the set pressure. The threshold setting, being unaffected by system backpressure present at the second port, would be accurately maintained.

In the preferred embodiment, the valve member also includes a piston portion joined to the poppet valve portion by a reduced diameter section. The piston portion includes a radial, preferably end surface against which a pilot pressure is applied to produce a force on the valve element that opposes the primary spring force. In essence, the application of pilot pressure to the piston portion effectively reduces the relief setting for the valve. The valve opens when the combined forces of the fluid at the first port and the pilot pressure exceeds the force applied by the primary spring.

According to a more specific embodiment, the valve member is a unitary element formed by spaced annuli joined by a reduced diameter section. The first annulus is larger than the second annulus and forms the poppet valve portion. An inner peripheral edge surface is adapted to engage the valve seat in a flow controlling relationship. A portion of the circumferential surface of the first annulus rides in a reduced diameter portion of the valve body bore.

The second annulus is slidably supported by a plug guide mounted and secured near one end of the bore and includes a through passage through which pilot pressure is communicated to the end surface of the second annulus. The movable valve seat is annular and surrounds the reduced diameter section of the valve element and includes a plurality of substantially radial ports that communicate fluid pressure at the first port to the radial surfaces defined on the poppet valve portion of the valve member.

The movable valve seat configuration provides an important feature of the invention. Not only does the valve seat cooperate with the valve element to form a flow controlling pressure relief valve, it also forms a check valve that allows substantially unrestricted fluid flow from the second port to the first port, whenever pressure at the second port exceeds the pressure at the first port. The valve seat is biased toward engagement with the valve element by a relatively light spring. Fluid pressure at the first port also urges the valve seat towards engagement with the valve member. Fluid pressure at the second port urges the valve seat towards a disengaged position but does not exert a net force on the valve member. Thus, whenever the pressure at the second port exceeds the combined force of the pressure at the first port and the valve seat biasing spring, the valve seat will move away from the valve element and allow fluid flow from the second port to the first port.

The valve member/valve seat configuration, particularly the use of a combination valve seat/check valve mounted coaxially with the flow controlling valve element, provides a pilot-assisted, pressure relieving valve having a relatively moderate pilot ratio. A valve constructed in accordance with the present invention, has been found to have a pilot ratio of approximately 4:1. This relatively low pilot ratio allows flow through the valve to be carefully modulated and controlled. When used in connection with a boom actuator, the present invention enables one to effect controlled, gradual motion in the actuator regardless of load.

Further features and a fuller understanding of the present invention will be obtained in reading the following description made in connection with the accompanying drawings.

BEST MODE FOR CARRYING OUT THE INVENTION

Figure 1:
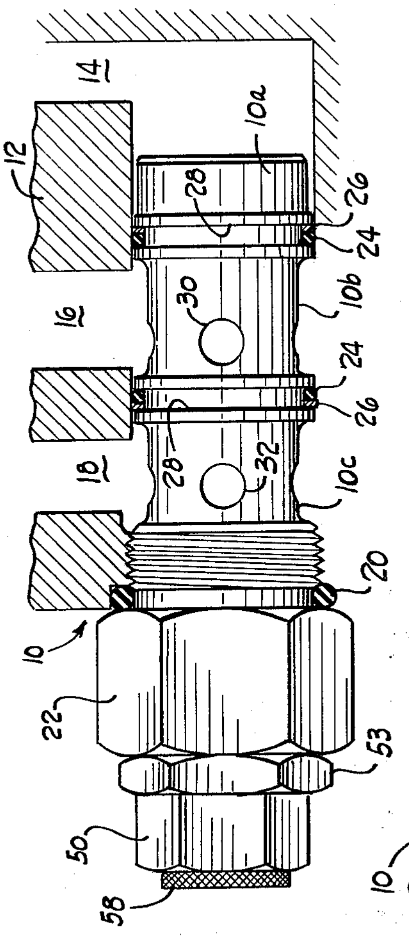
FIG. 1 is a side elevational view of a control valve constructed in accordance with the preferred embodiment of the invention.

FIG. 1 illustrates the overall construction of a control valve embodying the present invention, that can be used as a pilot-assisted pressure relieving valve or a sequence valve. The valve shown is constructed in a cartridge configuration but the invention itself is adaptable to non-cartridge type valves. The valve includes an elongate valve body 10 adapted to threadedly mount into a manifold or housing 12 (shown diagrammatically in FIG. 1) and when mounted extends between three fluid passages 14, 16, 18. An O-ring seal 20 prevents fluid leakage between the valve body 10 and the housing 12. The valve body includes a hexagonal portion 22 shaped to receive an appropriate wrench to facilitate installation and tightening. A pair of O-rings 24 and associated back up rings 26 are disposed in spaced grooves 28 on the valve body. The O-rings 24 sealingly engage the housing 12 and seal off fluid communication between adjacent sections **10*a*, 10*b*, 10*c* of the valve body 10**.

Figure 2:
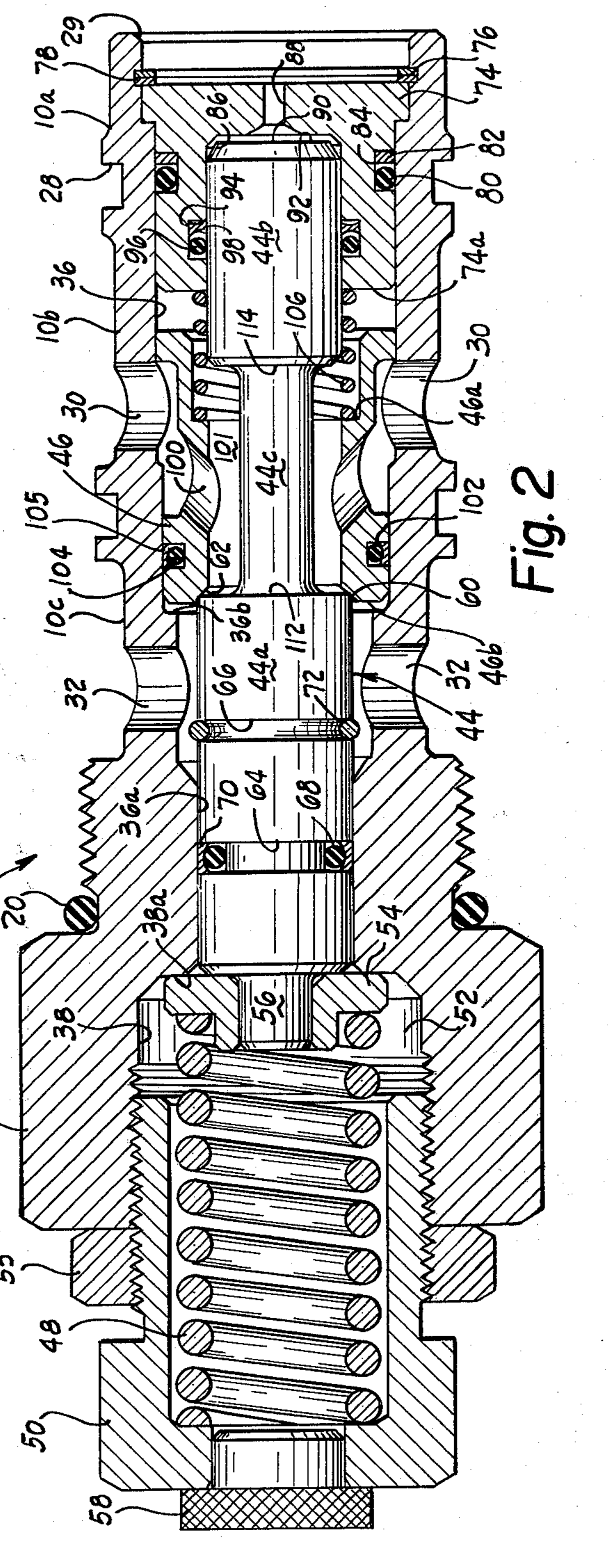
FIG. 2 is an enlarged cross sectional view of the control valve illustrated in FIG. 1.

Referring also to FIG. 2, the valve body section **10*a* defines an end opening 29 that communicates with the flow passage 14. The valve body section 10*b* communicates with the flow passage 16 and includes a plurality of radial ports 30. The section 10c communicates with the flow passage 18 and includes a plurality of radial ports 32**.

The valve body 10 defines a longitudinal, multistep bore 36 that extends from the end opening 29 and opens into a larger, partially threaded bore 38 formed on the left end of the valve body. The ports 30, 32 extend radially from the outer surface of the valve body 10 and open into the bore 36 at spaced locations.

A valve member 44 and a valve seat 46 constructed in accordance with the invention, are both slidably supported and guided within the bore 36 and cooperate to control the fluid communication between the radial ports 30, 32. When engaged, as shown in FIG. 2, fluid flow from the ports 30 to the ports 32 is prevented.

The valve member 44 is urged towards the right (as viewed in FIG. 2) by a primary biasing spring 48 adjustably captured in the valve body bore 38 by a threaded adjustment plug 50. The plug 50 and valve body bore 38 together form a spring chamber 52. A concentric lock nut 53 threaded onto the adjustment plug 50 is used to lock the position of the plug with respect to the valve body 10 after an adjustment has been made. It should be apparent that rotating the plug 50 into the bore 38 increases the compressive force of the spring 50 thus increasing the biasing force exerted on the valve member 44. The spring force is transmitted to the valve member 44 by an annular spring insert 54 that slidably mounts on a pin-like projection 56 that extends axially from the left end of the valve member 44. The rightmost position (as viewed in FIG. 2) of the right end of the spring 48 is limited by a shoulder 38a formed in the bore 38 against which the insert 54 abuts when the spring is fully extended within the spring chamber. A filter 58 is fastened to and extends through the adjustment plug 50 and vents the spring chamber 52 to atmosphere. The filter minimizes the entry of contaminants or dirt, etc. into the spring chamber 52.

In the preferred embodiment, the valve member 44 is constructed in a spool-like configuration and includes a pair of spaced annuli 44a, 44b joined together by a reduced diameter shank 44c. The first annulus 44a is larger than the second and forms a poppet valve. A peripheral edge 60 is engageable with a beveled seating surface 62 formed on the valve seat 46. Except for an O-ring groove 64 and a snap ring groove 66, the diameter of the first annulus 44a is substantially uniform. A portion of the outer, land-like surface of the annulus 44a confrontingly engages a reduced diameter portion 36a of the valve body bore 36. An O-ring 68 and concentrically mounted ring 70, carried in the groove 64, sealingly engage the bore portion 36a and prevent fluid leakage from the bore 38 into the spring chamber 52. A retaining ring 72 carried by the snap ring groove 66 limits the leftward movement of the valve member 44 and prevents the member 44 from being driven out of the valve body by fluid pressure should the plug 50 and spring 48 be removed.

The second, smaller diameter annulus 44b forms a piston portion and is slidably supported within a plug guide 74 located near the right end of the bore 36. The guide 74 is secured in position by a snap retaining ring 76, carried in an internal groove 78 formed in the valve body. An O-ring 80 and back-up ring 82 carried in an outer groove 84 prevents fluid leakage between the plug guide and the valve body.

The annulus 44b is received in a bore 86 formed in the plug guide 74 that extends into fluid communication with a relatively small diameter passage 88 formed, centrally in the guide. The passage 88 communicates fluid pressure from the end opening 29 of the valve body 10 to a chamber 90 formed by the bore 86 and an end surface 92 defined on the second annulus. The end surface forms an effective pressure area against which a fluid pressure is applied to develop a biasing force on the valve member 44 that urges it towards the left, as viewed in FIG. 2. An internal groove 94 carries an O-ring and back-up ring 96, 98 which sealingly engage an outer surface of the second annulus 44b to prevent fluid leakage between the bore 86 and the chamber 90.

The bore portion 36a and the plug guide 74 slidably support the valve member 44 for longitudinal, reciprocating motion toward and away from the valve seat 46. As seen in FIG. 2, the valve seat 46 is annular and coaxially surrounds the shank 44c of the valve member 44. A plurality of skewed-radial ports 100 are formed in the valve seat 46 and communicate fluid pressure from the ports 30 to the shank region, that is, the region 101 between the first and second annuli 44a, 44b. The region 101 between the annuli 44a, 44b forms a part of the fluid flow path between the ports 30, 32. An outer groove 102 carries and O-ring and concentric ring 104, 105 respectively which sealingly engage the bore 36 to prevent fluid leakage between the valve seat 46 and the bore 36. A relatively light biasing spring 106 acts between an end surface 74a of the plug guide 74 and an internal shoulder 46a formed in the valve seat 46 and urges the seat towards engagement with the peripheral edge surface 60 formed on the first annulus 44a.

The substantially radial, transition surfaces 112, 114 that extend between the circumferential surfaces of the first and second annuli, and the shank 44c, form effective pressure areas against which fluid pressure at the first ports 30 exerts axially directed forces. Because the first annulus is diametrically larger than the second annulus, a net effective pressure area equal to the difference between the cross sectional areas of the first and second annulus is defined on the surface 112. Fluid pressure from the ports 30 applied to this net effective pressure area exerts a net axial force on the valve member 44 urging it towards the left. This force opposes the biasing force applied by the spring 48 and should the fluid generated force exceed the spring force, the valve member 44 and valve seat 46 will move to the left until the seat 46 abuts the internal shoulder 36b formed in the bore 36, whereupon further leftward movement will cause the valve member 44 to disengage the valve seat 46 and allow fluid flow from the ports 30 to the ports 32 until the pressure at the ports 30 is reduced. It should be apparent, that the spring 48 determines the relief setting of the valve.

According to an important aspect of the invention, the valve seat 46 also functions as a check valve that is operative to allow fluid flow, substantially unrestricted, from the ports 32 to the ports 30 when the pressure at the ports 32 exceeds the pressure at the ports 30. When the valve seat 46 is in engagement with the valve member 44 (as shown in FIG. 2), fluid pressure at the ports 30 applies a force to the valve seat 46 urging it towards the left. These fluid forces tend to maintain the engagement between the valve seat 46 and the valve member 44. Conversely, any fluid pressure present at the ports 32 acts on the end surface 46b of the valve seat 46 and applies a force to the seat urging it towards the right.

When the fluid force developed on the end surface **46*b* exceeds the force supplied by the relatively light spring 106 and the fluid forces, if any, applied by fluid pressure at the ports 30, the valve seat 46 will move to the right allowing fluid flow to proceed from the ports 32 to the ports 30. This is accomplished without movement in the valve member 44**.

Figure 3:
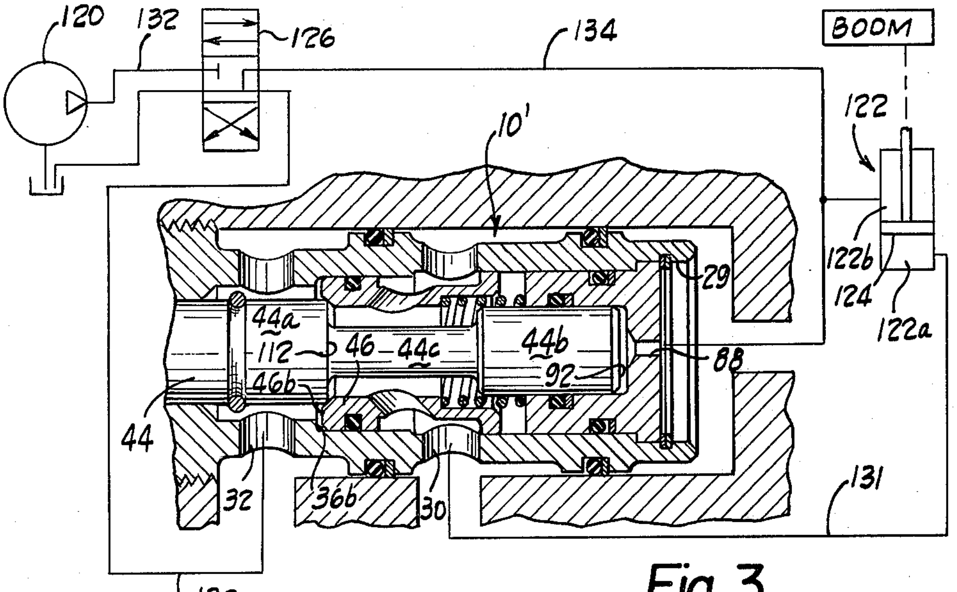
FIG. 3 diagrammatically illustrates one control application of the present invention.
Figure 4:
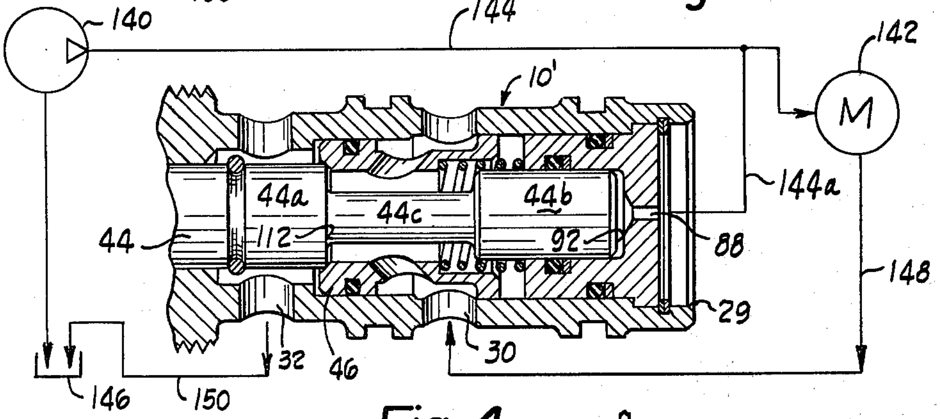
FIG. 4 diagrammatically illustrates another control application of the present invention; and, FIG. 5 diagrammatically illustrates still another control application of the present invention.
Figure 5:
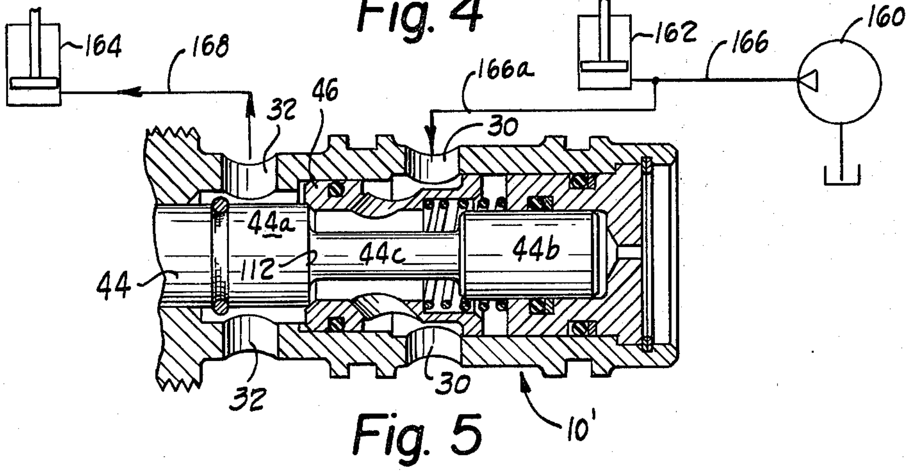

The operation of the disclosed valve is best done by way of examples. As noted previously, the control valve disclosed can be used as a pilot assisted, pressure relieving or a sequence valve because it is substantially insensitive to system back pressure. FIGS. 3–5 illustrate some typical applications for the present invention. For simplicity, only the fluid flow controlling portion of the valve, i.e. the right half of the valve as seen in FIG. 2, is shown and for purposes of explanation the control valve is designated in FIGS. 3–5 by the reference character 10'. In FIG. 3, the valve 10' forms part of a fluid pressure control circuit for a boom actuator and as such is often termed in the trade as a holding or overcenter valve. The circuit shown includes a fluid pump 120 for generating a source of pressurized fluid, a boom actuator 122 having respective cylinder and rod chambers **122*a*, 122*b* for causing extension and retraction of a piston 124, and a 3-position, operator controlled valve 126**.

A fluid supply conduit 130 communicates with the ports 32 of the present control valve and the ports 30 communicate with cylinder chamber **122*a* through a conduit 131. To effect boom extension, the operator valve 126 is shifted upwardly (as viewed in FIG. 3) to communicate a pump supply conduit 132 with the supply conduit 130. Pressurized fluid will proceed from the fluid pump 120 to the ports 32. This pressurized fluid will drive the valve seat 46 to the right thereby opening communication to the ports 30 and allowing fluid flow to proceed, substantially unimpeded to the cylinder chamber 122*a*, causing extension of the actuator 122. When the valve 126 is returned to its center position, fluid flow to the ports 32 is terminated, and as a result the seat 46 will immediately move to the left and reengage the valve member 44 preventing return fluid flow from the actuator 122**, thereby hydraulically locking the boom in position.

If a boom overload condition is encountered, the resulting excessive fluid pressure transmitted to the ports 30 will act on the radial surface 112 of the first annulus **44*a* and will move both the valve member and the valve seat 46 towards the left, until the end surface 46*b* of the seat 46 abuts the internal shoulder 36*b* formed in the bore 36, whereupon further leftward movement of the valve member 44 will cause the valve seat 46 and the member 44 to disengage and allow fluid flow from the ports 30 to the ports 32. As soon as the excess pressure is reduced, the valve member 44 will immediately reengage the valve seat 46 and terminate further flow. It should be noted that the fluid flow rate through the valve is determined by the magnitude of the excess pressure. Due to the valve member configuration and the biasing spring 48**, the flow rate reduces in proportion to the reduction in pressure. In essence, the flow is "throttled" whenever the valve is relieving excess pressure.

In order to lower the boom under the control of the operator, the control valve 126 is shifted downwardly to fluidly connect the pump supply conduit 132 with a supply conduit 134 that communicates with both the rod chamber **122*b* of the actuator 122 and the pilot passage 88 formed in the plug guide 74 by way of the end opening 29. The application of pressure to the chamber 122*b* will further pressurize the fluid in the chamber 122*a* increasing the fluid forces applied to the effective pressure area defined on the radial surface 112. The fluid pressure in the conduit 136 will also be applied to the end surface 92 of the second annulus 44*b*. The combined fluid forces developed on the radial surface 112 and the end surface 92 will eventually overcome the spring force and move the valve member 44 towards the left allowing controlled return fluid flow from the ports 30 to the ports 32. In essence, the fluid force applied to the end surface 92 of the piston portion 44*b* of the valve member 44 opposes the spring force applied by the spring 48 and thus reduces the effective pressure relief setting of the valve thereby enabling fluid pressure at the ports 32 less than the preset relief pressure to effect leftward movement of the valve member 44**.

Due to the valve member and valve seat configuration, relatively moderate pilot ratios, i.e. the ratio between the effective pressure area defined on the end surface 92 and the net effective pressure area defined on the surface 112, are possible. These moderate ratios allow an operator to easily modulate the flow through the valve during boom retraction, substantially eliminating abrupt, uncontrolled movements in the boom that often plague prior art devices. It has been found, that a valve constructed in accordance with the preferred embodiment of the invention has a pilot ratio of approximately 4.25:1, as compared to ratios in excess of 20:1 present in prior art valves. It should be apparent that the pilot ratio can be easily changed or modified by adjusting the relative diameters of the first and second annuli **44*a*, 44*b* which in effect will change the ratio between the area of the end surface 92 and the net effective area defined on the surface 112**.

The present valve is also well suited for a hydrostatic drive system in which a deceleration mode is desired whenever fluid pressure to the fluid drive motor is terminated. Referring to FIG. 4, a simplified hydrostatic drive circuit is illustrated. A fluid pump 140 is rotatable to deliver pressurized fluid to a fluid motor 142 by way of a supply conduit 144. The control valve 10' of the present invention is used to control the return fluid flow from the motor to a reservoir 146 which forms the source of fluid for the fluid pump 140. In operation, when the fluid pump is delivering pressurized fluid to the fluid motor, this same fluid pressure is applied to the end surface 92 of the second annulus **44*b* by a pilot pressure branch conduit 144*a*. The return fluid flow from the fluid motor is communicated to the ports 30 by a return conduit 148. The ports 32 communicate with the reservoir 146 through a conduit 150**.

As discussed earlier, pilot pressure applied to the end surface 92 effectively reduces the pressure relief setting of the valve and thus when the fluid pump is supplying pressurized fluid to the fluid motor, the pilot fluid pressure in the conduit **144*a* combines with the pressure of return flow in the conduit 148 to move the valve member 144 to the left and allow return fluid flow from the fluid motor to the reservoir 146 by way of the ports 30 and the ports 32. When the output of the fluid pump 140 is reduced or terminated, the pilot pressure in the conduit 144*a* is also reduced or terminated. As is well known, even though the output of the fluid pump is reduced, the fluid motor 142** will be rotated by the vehicle wheels, if the vehicle is moving. In the absence of pilot pressure (in the conduit 144*a*), the pressure of the returning fluid in the conduit 148 must exceed the relief setting of the valve in order to effect movement in the valve member 44 so that the fluid can proceed to the reservoir 146. This restricted or throttled return flow from the fluid motor causes the fluid motor to resist rotation of the vehicle wheels thus effecting deceleration.

It will be recognized by those skilled in the art, that the present invention is also adaptable to hydrostatic systems in which forward and reverse movements in the vehicle are accomplished by switching input and output ports on the fluid pump and/or reversing the pump. In this type of hydrostatic system, two control valves would be used, one being disposed in each of two fluid motor supply conduits.

FIG. 5 illustrates the application of the present invention as a sequence valve. In this example, a fluid pump 160 forms a source of pressurized fluid for an actuator 162 and an actuator 164. The present control valve delays the application of fluid pressure to the second actuator 164 until a "threshold" pressure, i.e. relief pressure, is developed. Specifically, the pump 160 delivers pressurized fluid directly to the actuator 162 through a supply conduit 166. A branch conduit **166*a* communicates with the ports 30. The ports 32 communicate with the actuator 164 through a conduit 168**. In the example shown, the pilot section of the valve is not used.

In operation, the fluid pump 160 feeds pressurized fluid to the actuator 162 to cause immediate extension. The control valve 10', however, prevents the communication of pressurized fluid to the actuators 164 due to the engagement between the valve seat 46 and the valve member 44. Once the actuator 162 fully extends, the pressure in the conduit 166, will increase until the pressure in the conduit **166*a* exceeds a relief setting of the control valve 10' causing the member 44 to disengage the seat 46 and allow fluid flow from the ports 30 to the ports 32. In this way, the control valve 10' of the present invention will insure that the actuators 162, 164 extend sequentially, that is, the actuator 164 will not begin to extend until the actuator 162 has fully extended. Although not shown, it should be clear that the return flow from the actuator 164 will be accomplished by the check valve function provided by the movable valve seat 46. The spring 48 (shown in FIG. 2) determines the pressure at which the actuator 164 will begin receiving fluid pressure from the pump 160**.

It is important to note that, in this example the presence of system back pressure in no way affects the "threshold" setting for the valve. As noted earlier, the uniform diameter of the first annulus **44*a* insures that only radial forces are applied to the first annulus by fluid pressure at the ports 32. Movement inducing axial on longitudinal forces are not applied to the first annulus and thus fluid pressure at the ports 32** cannot effect a change in the threshold or relief setting of the valve.

Although the present invention has been described with a certain degree of particularity, it should be understood that various changes can be made to it by those skilled in the art without departing from the spirit or scope of the invention as described and hereinafter claimed.

I claim:

1. A control valve, comprising:

(a) a valve body defining an internal bore and spaced, first and second port means communicating with said internal bore;

(b) an elongate valve member, slidably supported in said bore, the valve member including a poppet valve portion and a piston portion joined together by an interconnecting portion, said interconnecting portion defining at least a portion of a fluid flow path between said first and second port means;

(c) a valve seat disposed in said bore including an inclined seat surface engageable with a peripheral edge surface defined by the poppet valve portion of said valve member for controlling fluid flow between said first and second port means;

(d) said poppet valve portion defining a bore confronting circumferential surface that slidably engages a section of said internal bore, the diametral extent of said circumferential surface being substantially equal to the diametral extent of said peripheral edge surface;

(e) spring biasing means for urging said poppet valve portion into engagement with said valve seat, said spring biasing means disposed in a valve body chamber vented to the atmosphere;

(f) seal means coengaging said circumferential surface and said internal bore section to inhibit fluid leakage into said chamber;

(g) said poppet valve portion including an inner radial surface forming an effective pressure area for applying fluid forces in a direction substantially opposed to the force exerted by said spring biasing means; and, (h) means communicating fluid pressure at said first port means to said effective pressure area.

2. The control valve of claim 1 wherein said valve member is spool-like in configuration and said poppet valve and piston portions are formed by spaced lands, the poppet valve portion being diametrically larger than said piston portion.

3. The control valve of claim 1 wherein said piston portion includes an end surface that defines a pilot pressure effective area and said control valve further comprises a means for communicating a pilot pressure to said effective pressure area.

4. The control valve of claim 1 wherein said valve seat is a slidable annular element, supported in said bore in coaxial alignment with said poppet valve portion and provides a check valve function, allowing relatively unimpeded fluid flow from the second to the first port means.

5. The control valve of claim 1 further comprising a spring stop means disposed in said vented chamber for limiting the maximum extension of said spring biasing means, whereby a biasing force applied to said valve member by said spring biasing means is substantially reduced when said valve member is in a fluid flow interrupting position.

6. A control valve usable as a sequence valve or a pilot assisted, pressure relieving valve, comprising:

(a) a valve body defining a multi-stepped bore and spaced, first and second ports communicating with said bore;

(b) an elongate valve member comprising at least two spaced annuli joined by a reduced diameter portion, said annuli supported within said bore for reciprocating, axial motion;

(c) one of said annuli defining a poppet valve portion and another of said annuli defining a piston portion and the one annulus being diametrically greater than the other annulus;

(d) a combination valve seat and check valve guided for reciprocating motion by said valve body bore and positioned in coaxial alignment with said valve member;

(e) said seat including an annular, internal beveled portion defining a seat surface engageable with a peripheral seating surface defined on said poppet valve portion of said valve member;

(f) spring biasing means housed within an atmospherically vented chamber defined at least partially by said valve body, urging said valve member towards engagement with said movable valve seat;

(g) stop means disposed in said vented chamber for limiting the maximum extension of said spring biasing means, whereby a biasing force applied to said valve member by said spring biasing means is substantially reduced when said valve member is engaging said movable valve seat;

(h) said one annulus defining a radial surface forming an effective pressure area exposed to fluid pressure near said first port, said fluid pressure applied to said radial surface rendering said spring biasing means at least partially ineffectual;

(i) said other annulus including an end surface that defines an effective pressure area against which a pilot pressure can be applied to further oppose said spring biasing means; and, (j) sealing means mounted to said one annulus and sealingly engaging a portion of said valve body bore and operative to inhibit fluid leakage into said chamber.

7. The control valve of claim 6 wherein said one annulus includes a bore confronting surface that slidably engages a section of said internal bore, the diametral extent of said bore confronting surface being substantially equal to the diametral extent of said peripheral seating surface.

* * * * *